Oct. 17, 1967　　　　M. M. DE LONG ET AL　　　　3,347,031
CUCUMBER HARVESTER
Original Filed Oct. 3, 1963　　　　　　　　　　　　6 Sheets-Sheet 1
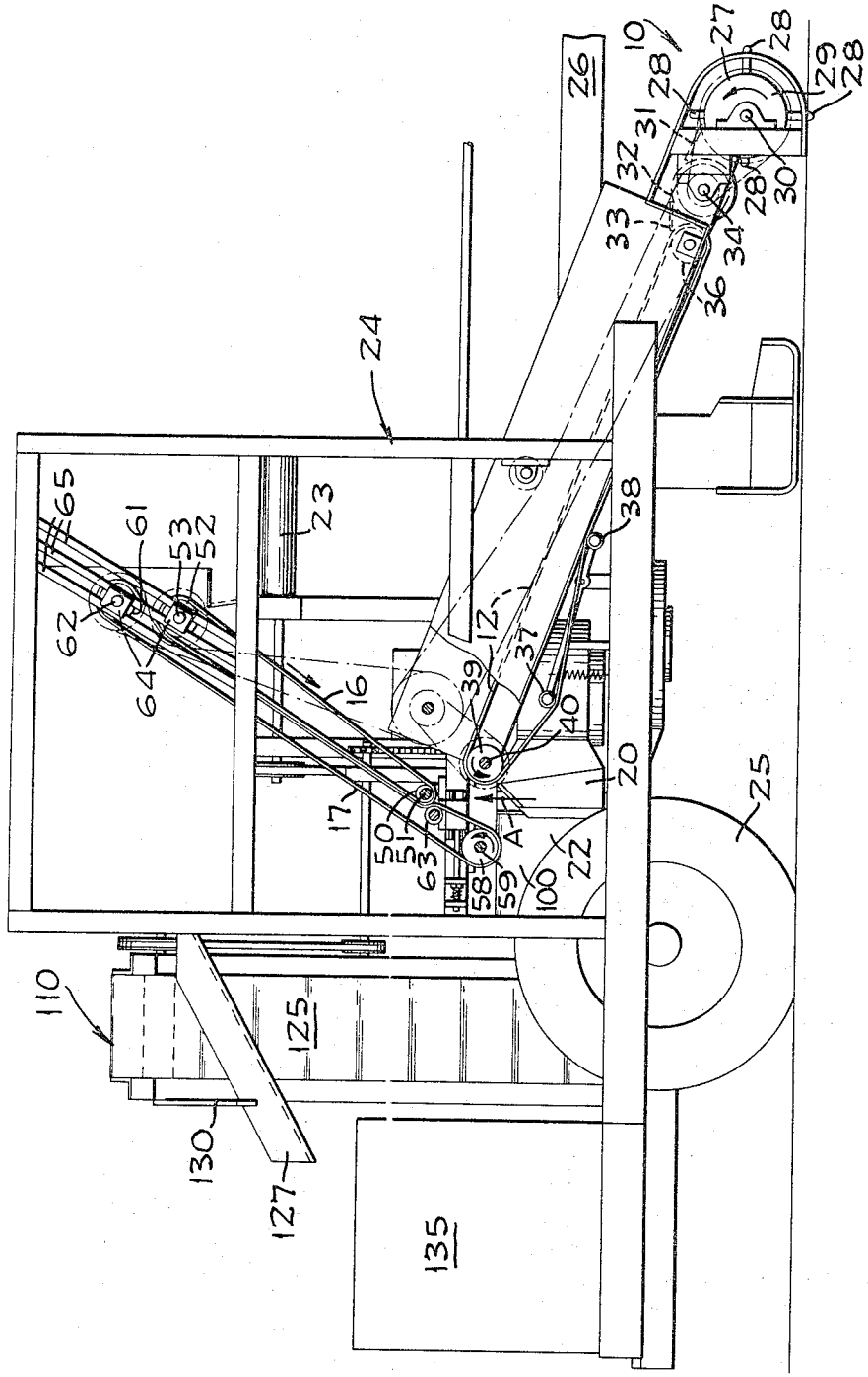
FIG—1
INVENTORS.
MAX M. DE LONG
BILL A. STOUT
STANLEY K. RIES
BY Hans G. Hoffmeister
ATTORNEY

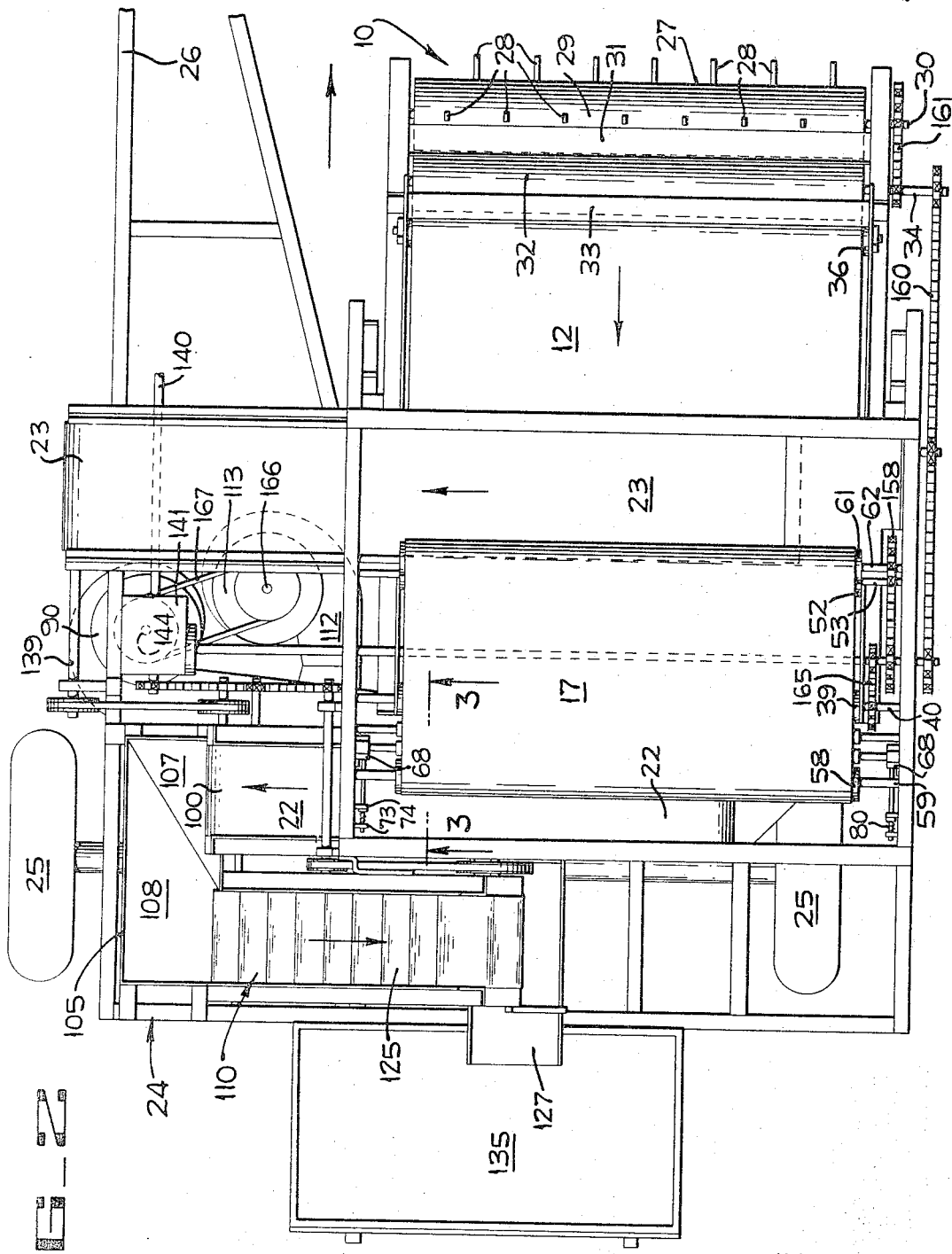

Oct. 17, 1967   M. M. DE LONG ET AL   3,347,031
CUCUMBER HARVESTER
Original Filed Oct. 3, 1963   6 Sheets-Sheet 3

INVENTORS
MAX M. DE LONG
BILL A. STOUT
STANLEY K. RIES

BY Hans G. Hoffmeister
ATTORNEY

Oct. 17, 1967  M. M. DE LONG ET AL  3,347,031
CUCUMBER HARVESTER
Original Filed Oct. 3, 1963  6 Sheets-Sheet 4
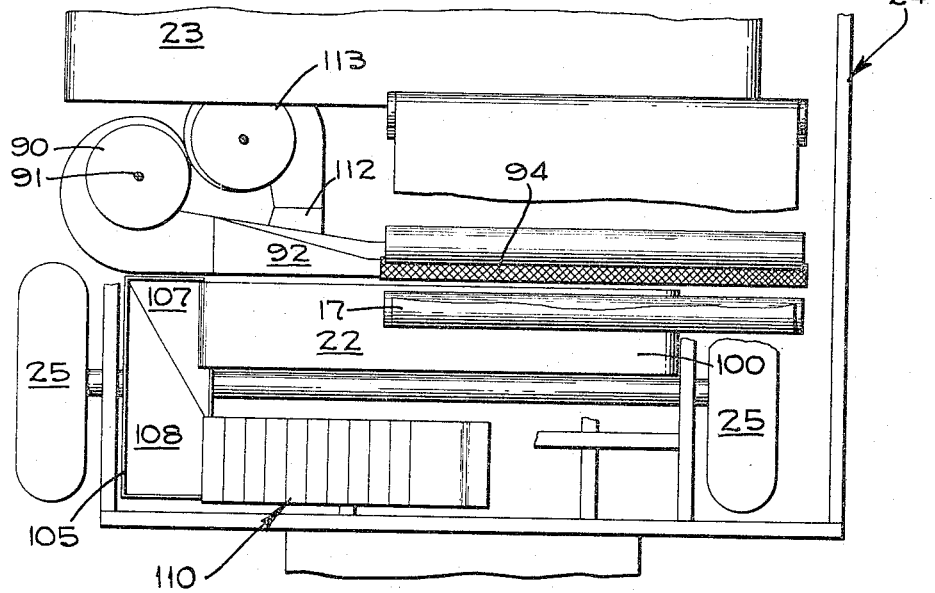
FIG_4
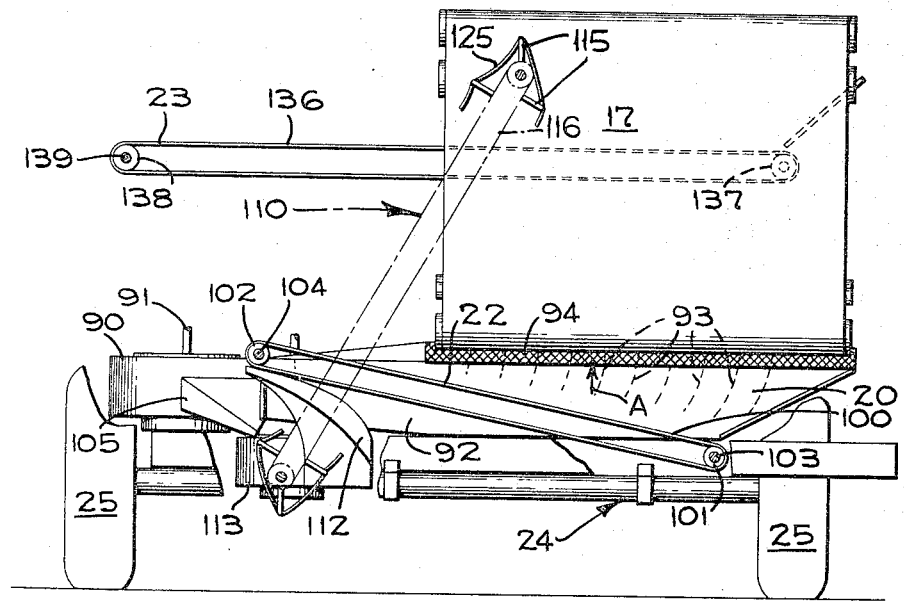
FIG_5
INVENTORS
MAX M. DE LONG
BILL A. STOUT
STANLEY K. RIES
BY Hans G. Hoffmeister
ATTORNEY

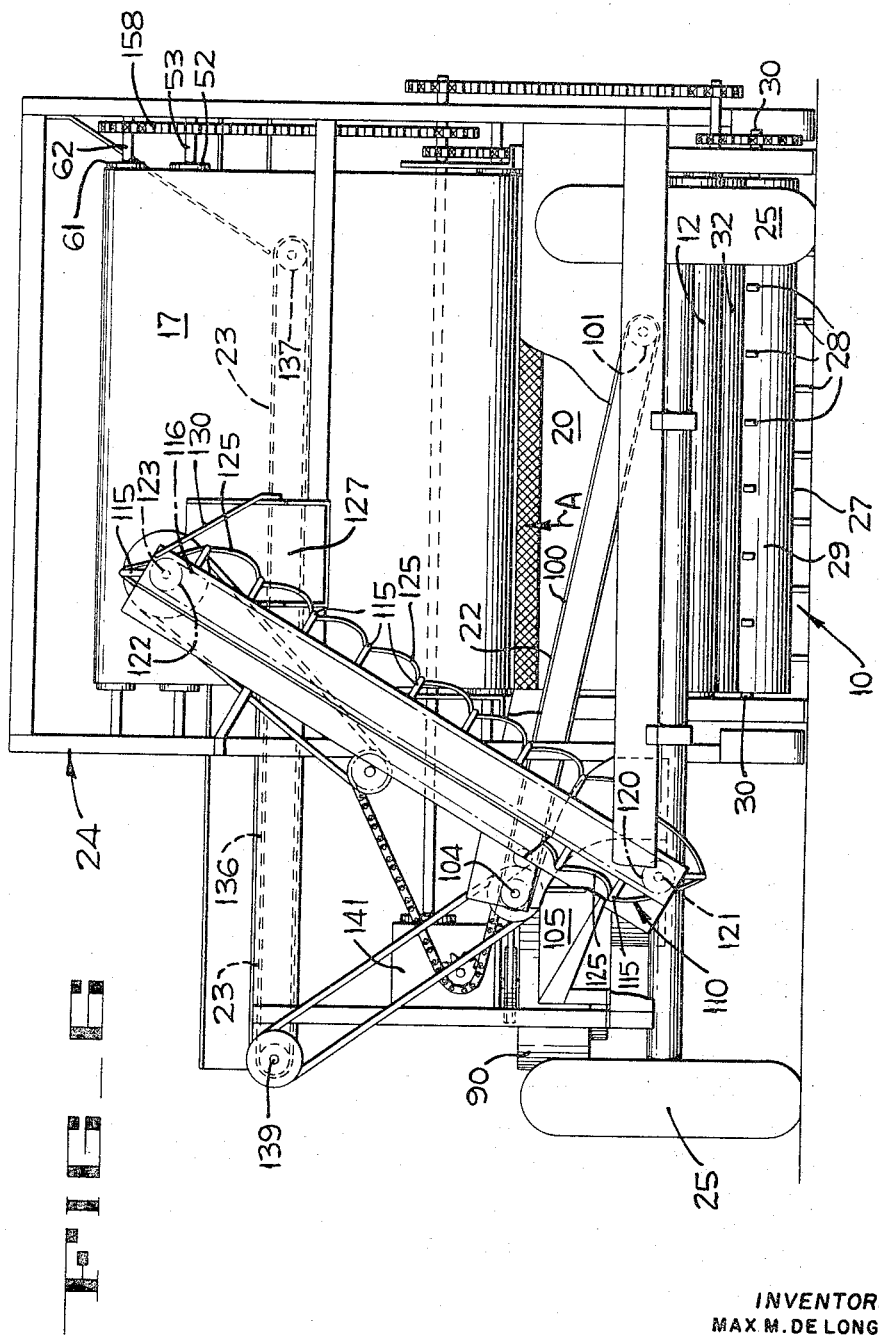

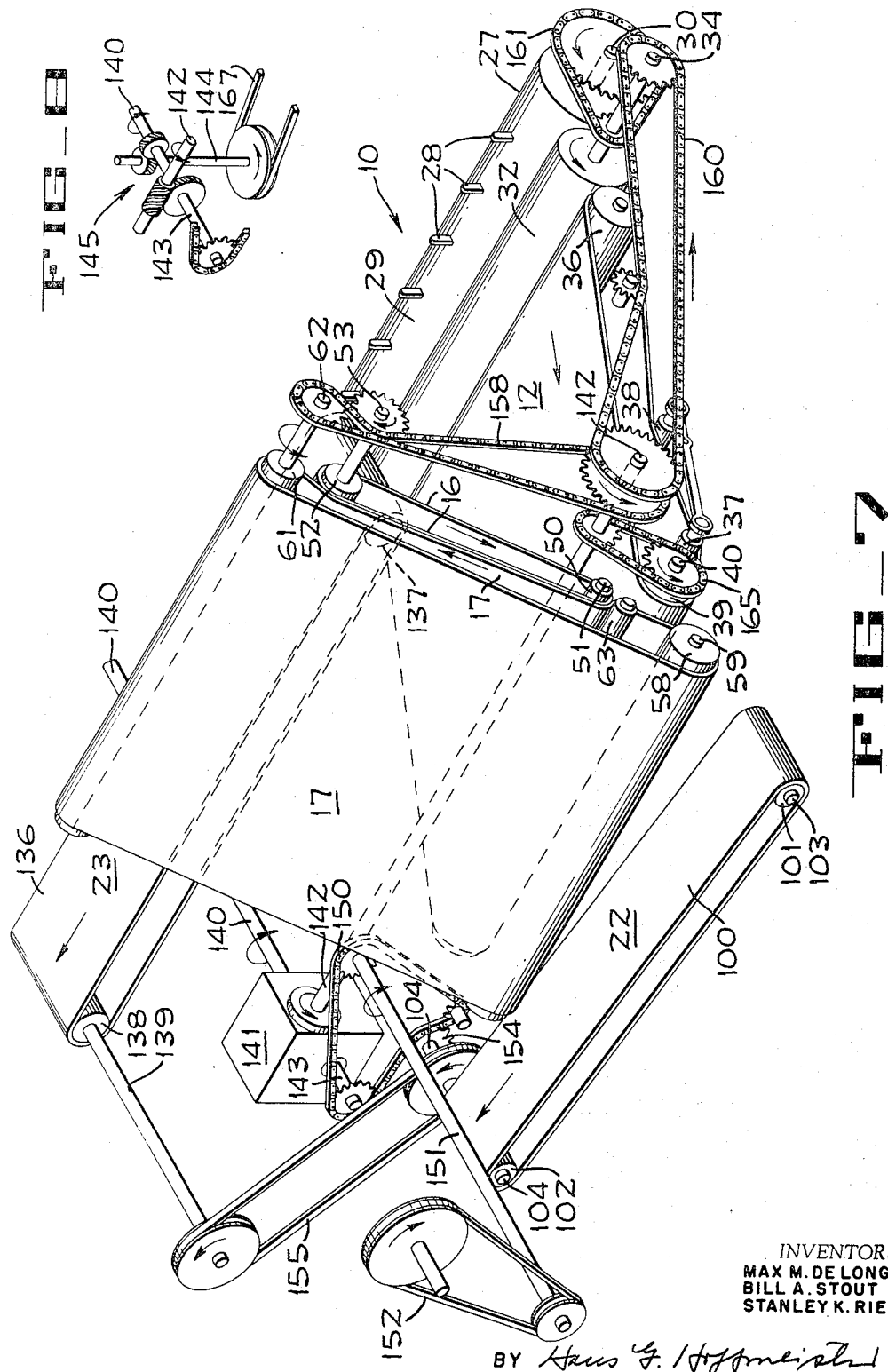

United States Patent Office 3,347,031
Patented Oct. 17, 1967

3,347,031
CUCUMBER HARVESTER
Max M. De Long, Warren, and Bill A. Stout and Stanley K. Ries, East Lansing, Mich., assignors to Board of Trustees of Michigan State University, East Lansing, Mich., a constitutional corporation
Continuation of application Ser. No. 313,529, Oct. 3, 1963. This application Sept. 30, 1966, Ser. No. 583,484
2 Claims. (Cl. 56—327)

ABSTRACT OF THE DISCLOSURE

Growing cucumber vines and attached cucumbers are removed from the ground and propelled along a trajectory that leads directly into nip throat surfaces formed by belts and back-up rollers which grip and pull on the vines in order to pinch off the cucumbers. The belts, one of which is a firmly backed-up continuation of a nip throat surface, continue to pull on the vines after they have passed through the nip, in order to assist in the pulling action, and pinch off the cucumbers without abrading through the vines.

---

This application is a continuation of Ser. No. 313,529 filed Oct. 3, 1963.

This invention pertains to a method of harvesting vine crops and apparatus for carrying out the method, and more particularly relates to a method of and apparatus for removing cucumbers and the like from the vines on which they have grown.

The machine of the present invention is particularly adapted for harvesting growing, springy vine crops (e.g., cucumbers) in a one-pass operation wherein the vines with the fruit attached are pulled or cut loose from the ground before the fruit is separated from the vines. It has been proposed that, after the vines have been gathered up, the fruit be separated from the vines by pulling on the vines while holding the fruit against movement with the vines. Such a procedure has heretofore been generally unsatisfactory because no apparatus has been available that is capable of exerting a sustained pull on the vines that is of sufficient strength to snap the fruit from the vines. Accordingly, it is an object of the present invention to provide an improved vine pulling mechanism for a harvester.

Another object is to provide a harvester capable of snapping cucumbers or the like from vines.

Another object is to provide a harvesting mechanism wherein the vines and the separated fruit are moved in substantially opposite directions so that the loose fruit does not interfere with the vine-pulling operation.

Another object is to provide an efficient device for introducing vines and the like into a vine-pulling mechanism.

Another object is to provide an improved method of harvesting vine crops.

Another object is to provide an improved method of separating fruit from the vines on which they have grown.

Other and further features and advantages of the present invention will become apparent from the following description taken in connection with the accompanying drawings, in which:

FIGURE 1 is a diagrammatic side elevation of the harvesting machine of the present invention.

FIGURE 2 is a diagrammatic plan of the machine of FIG. 1.

FIGURE 3 is an enlarged diagrammatic section taken along line 3—3 of FIG. 2.

FIGURE 4 is a fragmentary diagrammatic plan, showing a portion of FIG. 2 with certain structure removed so that the blower system is clearly disclosed.

FIGURE 6 is a diagrammatic elevation of the rear end of the machine.

FIGURE 7 is a diagrammatic perspective of the power train of the harvester.

FIGURE 8 is a fragmentary diagrammatic perspective of a gear mechanism that may be used in the power train of FIG. 7.

Figure 5:
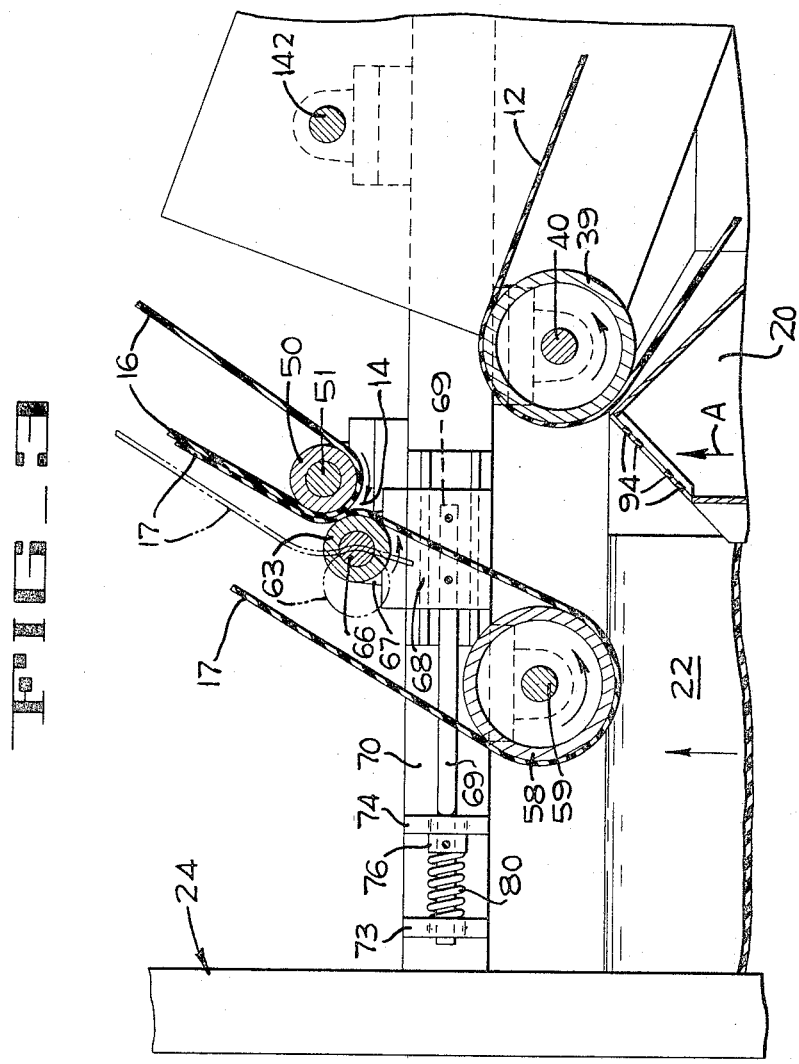
FIGURE 5 is a fragmentary, simplified, diagrammatic end elevation of a portion of the rear end of the machine, particularly showing the parts emphasized in FIG. 4.

The embodiment of the harvester chosen for illustration in FIGS. 1 and 2 comprises, in general, a vine pickup mechanism 10 arranged to grip vines on the ground, pull them loose, and carry them to an upwardly inclined conveyor 12. On the conveyor, the vines with the cucumbers attached are carried upwardly to a separation station adjacent a restricted entrance 14 (FIG. 3) formed between the upwardly moving runs of two adjacent endless belts 16 and 17. A continuous blast of air is directed upwardly in the direction of arrow A from a housing 20 to urge the vines, leafs, stems and the like, into contact with the opposed belts 16 and 17 so that this material is gripped by the belts and carried upwardly in the space between the belts. The entrance 14 is so restricted in size that cucumbers cannot enter and this forms a nip throat. Accordingly, the vines become tensioned due to the upward pulling action of the belts and, eventually, the cucumbers are snapped from the vines and fall downwardly onto a cucumber discharge conveyor 22. The vines are carried upwardly and are discharged onto a vine take-away conveyor 23 (FIG. 1). It will be noted from the direction of the arrow A in FIGURE 3, that the inclination angle of the vine lifting force from the vertical is small. This takes advantage of the column-like nature of green, springy cucumber vines, and assists in lifting the vines and cucumbers attached thereto along their length into the nip or restricted entrance 14.

The mechanisms making up the present harvester are mounted on a rigid frame structure 24 that is supported by two rear wheels 25 and is provided with a tow bar 26 which is adapted to be connected to a tractor in a conventional manner.

The vine pick-up mechanism 10 (FIG. 1) comprises a pick-up reel 27 having a plurality of fingers 28 projecting radially from a cylindrical housing 29. The pick-up fingers are mounted, internally of housing 29, on a shaft 30 that rotates in a counterclockwise direction. The fingers 28, which may be of the type disclosed in the patent to Carroll, No. 2,701,634, are adapted to project out of the housing 29 for a maximum distance in the vine pickup area and to be retracted inwardly of the housing as they approach a plate 31 which extends transversely of the machine between the pickup reel and a roller 32. The vines are stripped from the reel 27 and are transferred over the plate 31, over the roller 32 and a second transverse plate 33 and onto the inclined conveyor 12. The roller 32 is also rotatable counterclockwise, being keyed to a drive shaft 34 which, along with shaft 30 is journalled in bearings mounted on the rigid frame 24 of the machine.

The conveyor 12 is an endless belt conveyor made of conventional belting material. Preferably, it is made of a rubber composition or has a rubberized surface adapted to frictionally grip the vines and cucumbers and carry them upwardly. The belt may be approximately four feet wide and is trained over an idler roller 36, tensioning rollers 37 and 38, and a drive roller 39 that is keyed to a drive shaft 40.

The separating belt 16 is an endless rubber member that is disposed around an idler roller 50 which is rotatable on a shaft 51 and around a drive pulley 52 that is keyed to a drive shaft 53. The belt 17 is trained around an idler roller 58, that is rotatable on a shaft 59, around an upper roller 61 that is keyed on a drive shaft 62, and around a tensioning roller 63. Each of the drive shafts 53 and 62 is journalled at each end in a bearing block 64 that is adjustably mounted on fixed frame members 65.

The tensioning roller 63 (FIG. 3) is rotatably journalled on a shaft 66, each end of which is carried in a bearing block 67 mounted on a slide block 68, suitably guided in a frame member 70. A rod 69 is secured in each of the two slide blocks 68 and is slidably journalled in two spaced guides 73 and 74 that are mounted in fixed position on the frame member 70. A collar 76 is keyed to each rod 69 and a coil spring 80, that is disposed between the guide block 73 and the collar 76, urges the associated slide block and the shaft 66 carried thereby toward the right (FIG. 3). Thus, the roller 63 is resiliently loaded at each side of the machine and, accordingly, the belt 17 is urged into engagement with the belt 16 at the vine entrance 14. It will be evident that, by adjusting the collars 76 on the rods 69, the spring loading on the roller 63 can be varied.

The air blast that is directed upwardly from the housing 20 toward the vine entrance 14 is generated by a blower 90 (FIGS. 4 and 5) that is mounted on the left side of the frame of the machine and has a drive shaft 91. The blower has a typical central inlet eye and a discharge conduit 92 that extends to the right and opens into the housing 20. The housing has curved guide vanes 93 and, as seen in FIG. 5, the upper open end of the housing is covered by a grill 94. Accordingly, the cucumbers and other material that are separated from the vines by the belts 16 and 17 will not drop into the housing 20 but will be deflected by the inclined grill onto the discharge conveyor 22.

Referring to FIG. 5 it will be seen that the conveyor 22 is an endless belt conveyor and includes a belt 100 trained over a lower idler roller 101 and over an upper drive roller 102. The lower roller is carried on a shaft 103 and the upper roller 102 is keyed to a drive shaft 104. Cucumbers, leaves, twigs and the like are carried upwardly by belt 100 and dropped over the upper end thereof onto a chute 105 which includes slanted bottom panels 107 and 108 adapted to direct the cucumbers into pockets of an elevating conveyor 110.

As the leaves, twigs and other trash drop over the upper end of the conveyor belt 100 they are entrained in a stream of air that is directed across their downward path by a curved conduit 112 (FIG. 5) that is connected to the discharge opening of a second blower 113 (FIG. 4). Accordingly, substantially all of the trash is removed at this point and only the cucumbers are delivered to the elevator conveyor 110.

The elevator conveyor 110 is of the type that includes a plurality of posts 115 (FIG. 6) each of which is mounted on a special link of an endless chain 116 so that it projects outwardly therefrom. Each post is positioned directly opposite an identical post (not shown) that is mounted on an identical endless chain. Each of the chains is trained around an idler sprocket 120 on a shaft 121 and around a drive sprocket 122 keyed to a shaft 123. An endless flexible belt 125 is carried by the posts 115, being secured to the outer ends of the posts in such a manner that the belt droops between posts in the upper run of the conveyor to form cucumber-receiving pockets. As the pockets move around the upper drive end of the conveyor, the portion of the belt between the posts passing around the end is tensioned to a generally straight-line position to discharge the cucumbers into a chute 127 (FIG. 1). The chute 127, which may be supported from the upper end of the frame of the elevator conveyor 110 by braces 130 (one only being shown), is arranged to direct the cucumbers into a box 135 that rests on the rear of the frame 24 in a position where it may be easily removed when it is filled.

The vine take-away conveyor 23 is an endless belt conveyor including a belt 136 that is trained around an idler roller 137 and around a drive roller 138 that is keyed to a drive shaft 139.

The various mechanisms of the harvester are driven from the power take-off shaft of a typical tractor by means of a shaft 140 (FIG. 7) that is adapted to have its free end connected, by a well known hitch, in universal pivoting and driving engagement with the power take-off shaft of the tractor. At its other end, the shaft 140 is connected in a gear box 141 to a typical gear mechanism that is effective to drive a laterally projecting main drive shaft 142, a forwardly projecting shaft 143, and a downwardly projecting blower drive shaft 144 (FIG. 8). The gear mechanism may be of any conventional type such as the mechanism 145 disclosed in FIG. 8.

The forwardly projecting shaft 143 drives the drive shaft 123 of the elevator conveyor 110 by means of a sprocket and chain unit 150, a horizontal rotatable shaft 151, and a belt and pulley drive 152. The sprocket and chain unit 150 also rotates a sprocket 154 that is keyed on the drive shaft 104 of the cucumber discharge conveyor 22. The drive shaft 104 is also effective to rotate the drive shaft 139 of the vine take-away conveyor through a belt and pulley drive 155.

The transversely extending, main drive shaft 142 drives the drive shafts 62 and 53 of the vine-pulling belts 17 and 16 respectively by means of a sprocket and chain drive unit 158. The unit is so arranged that the inner, adjacent runs of the belts 17 and 16 move upwardly to exert an upward pulling force on thte vines.

The shaft 30 on which the pick-up fingers 28 are mounted and the drive shaft 34 of pick-up roller 32 are driven by the main drive shaft 142 through sprocket and chain drive units 160 and 161. The drive shaft 40 of the endless belt feeding conveyor 12 is connected to the main drive shaft 142 by a sprocket and chain unit 165.

The downwardly projecting shaft 144 forms a continuation of the shaft 91 of blower 90 and drives a shaft 166 of blower 113 through a belt and pulley drive 167.

Since the mechanisms are all driven from a common power take-off shaft, their speeds can be effectively coordinated. In one successful operation the ratio of the speed of shaft 140 to the shaft of the feed conveyor 12 was 1.62 to 1. The ratio of the linear speed of the picking belts to the linear speed of the feed belt was 1.46 to 1. The speed ratio of the shaft 140 to the shaft 91 of blower 90 was 1 to 7. It is to be understood that the drive mechanisms illustrated herein are intended to disclose the general nature of suitable drive mechanisms and that these illustrations are not intended to disclose their specific design in regard to size, number of teeth and the like, such details of design being within the skill of one working in the harvesting field.

In operation, the fingers 28 (FIG. 1) of the pick-up mechanism 10 grips the vines and pulls them upwardly and cooperates with the plates 31 and 33 and the roller 32 to move the vines onto the feed conveyor 12. As the vines move over the upper end of the conveyor 12 (FIG. 3), the blast of air from housing 20 lifts the leaves and vines upwardly into the entrance 14 defined by the belts 17 and 16. As the belts pull the vines upwardly, each cucumber comes into engagement with belts and is prevented from entering the space between the belts. The tension on the stems increase and eventually the cucumbers are snapped off the vines and drop downwardly, and are directed onto the conveyor 22. The vines are carried upwardly and discharged onto the take-away conveyor 23.

The cucumbers and some trash such as leaves, stems and the like are carried upwardly on conveyor 22 (FIG. 5) and drop over the upper end thereof. The leaves and other relative light material becomes entrained in the stream of air leaving the discharge conduit 112 and is carried over the side of the machine. The cucumbers are directed by chute 105 onto the elevator conveyor 110 which transfers them to the storage box 135 (FIG. 1) by means of chute 127.

It will be evident that suitable bearings, braces and other mechanical parts are provided in the present machine in accordance with well known engineering practice.

From the foregoing description, it will be evident that the present invention provides a new, efficient method of harvesting vine crops in that the new air mechanism for introducing vines to a vine-pulling device is completely different from any previously available. The use of opposed belts for tensioning the vines makes possible a sustained pull of sufficient force to effectively snap the cucumbers from the vines. Further, the arrangement whereby the cucumbers are permitted to drop downwardly while the vines are pulled upwardly assures that the loose cucumbers will not interfere with the pulling action of the belts.

While a preferred embodiment of the invention has been disclosed herein, it will be understood that modifications and variations may be effected without departing from the scope of the invention which is limited only by the scope and proper interpretation of the appended claims.

What is claimed is:

1. A machine for harvesting cucumbers growing along the length of the vines comprising a support structure; opposed, normally engaged vine gripping means mounted on said support structure for removing cucumbers from the uprooted vines, said vine gripping means comprising a pair of endless movable members having converging peripheral vine gripping surfaces moving in circular paths that form a nip throat, means for urging said members together to bring said circularly moving surfaces into firm engagement for pinching off cucumbers before they can pass between the surfaces; means on said support structure for removing the green vines from the ground; vine elevating and nip throat feeding means comprising means for conveying the uprooted vines and attached cucumbers to a zone that is spaced from said nip throat and for urging the vines across said space and directly into contact with the vine gripping surfaces of both movable members within said nip throat; said nip throat feeding means being directed for delivering the vines to the nip throat along a trajectory that substantially passes between said vine gripping surfaces at said nip throat; and means for continuing the pull on the vines after they have passed through said nip throat, said latter means comprising a firmly backed-up continuation of one of said vine gripping surfaces to form an additional vine gripping zone, and an opposed vine gripping surface moving in the same direction as that of said continuation surface, and means for bringing said opposed vine gripping surface into firm engagement with said continuation surface over a zone of substantial linear extent downstream of said nip throat.

2. The harvesting machine of claim 1, wherein said peripheral vine gripping surfaces are upwardly moving to form a generally downwardly opening nip throat, said nip throat feeding means being so disposed relative to the nip throat that the vines are delivered to the nip throat at a relatively small inclination angle from the vertical.

References Cited

UNITED STATES PATENTS

| | | | |
|---|---|---|---|
| 1,042,859 | 10/1912 | Whitmore | 130—30 |
| 1,715,214 | 5/1929 | Wright et al. | 171—17 |
| 2,491,739 | 12/1949 | La Dow. | |
| 2,558,894 | 7/1951 | Wright | 130—30 |
| 2,644,292 | 7/1953 | Oberholtz et al. | 56—364 |
| 2,724,226 | 11/1955 | Askviken et al. | 171—17 |
| 2,841,947 | 7/1958 | Grew | 56—327 |
| 2,901,048 | 8/1959 | Krukowski | 171—28 |
| 2,953,209 | 9/1960 | De Marco | 171—28 |

ABRAHAM G. STONE, *Primary Examiner.*

RUSSELL R. KINSEY, *Examiner.*